United States Patent
Wang et al.

(10) Patent No.: US 11,562,403 B2
(45) Date of Patent: Jan. 24, 2023

(54) METHOD, COMPUTING DEVICE AND SYSTEM FOR PROFIT SHARING

(71) Applicant: OBOOK INC., New Taipei (TW)

(72) Inventors: Chun-Kai Wang, Taipei (TW); Chung-Han Hsieh, Taipei (TW); Hsiu-An Teng, Taipei (TW); Chih-Yang Liu, Taipei (TW); Wei-Te Lin, Taipei (TW); I-Cheng Lin, Taipei (TW); Shin-Ying Chu, Taipei (TW); Zih-Hao Lin, Yilan County (TW); Kang-Hsien Chang, Taipei (TW)

(73) Assignee: OBOOK INC., New Taipei (TW)

(*) Notice: Subject to any disclaimer, the term of this patent is extended or adjusted under 35 U.S.C. 154(b) by 0 days.

(21) Appl. No.: 17/129,876

(22) Filed: Dec. 21, 2020

(65) Prior Publication Data
US 2022/0198524 A1 Jun. 23, 2022

(51) Int. Cl.
*G06Q 30/02* (2012.01)
*G06F 16/27* (2019.01)
(Continued)

(52) U.S. Cl.
CPC ......... *G06Q 30/0274* (2013.01); *G06F 16/27* (2019.01); *G06F 16/285* (2019.01);
(Continued)

(58) Field of Classification Search
None
See application file for complete search history.

(56) References Cited

U.S. PATENT DOCUMENTS

2018/0276626 A1* 9/2018 Laiben ............ G06Q 20/02
2018/0276710 A1* 9/2018 Tietzen ............ G06N 20/00
(Continued)

FOREIGN PATENT DOCUMENTS

CN 107480475 A 12/2017
CN 108513669 A 9/2018
(Continued)

OTHER PUBLICATIONS

Design of Network Media's Digital Rights Management Scheme Based on Blockchain Technology, Xu et al., 2017 IEEE 13th International Symposium on Autonomous Decentralized Systems.*
(Continued)

*Primary Examiner* — David J Stoltenberg
(74) *Attorney, Agent, or Firm* — Winston Hsu (57) ABSTRACT

A method for profit sharing is provided. The method includes deciding a first sharing rate according to a first event information and a first category information; obtaining a first sharing amount according to the first sharing rate and a first shared profit of the first category information; deciding a second sharing rate according to a second event information and a second category information; obtaining a second sharing amount according to the second sharing rate and a second shared profit of the second category information; deciding a total sharing amount by summing up the first sharing amount and the second sharing amount; and returning the total sharing amount in response to receiving a request from a user device.

10 Claims, 3 Drawing Sheets

(51) Int. Cl.
*G06F 16/28* (2019.01)
*G06F 16/955* (2019.01)
*G06Q 20/38* (2012.01)

(52) U.S. Cl.
CPC ..... *G06F 16/9558* (2019.01); *G06Q 20/3821* (2013.01); *G06Q 30/0246* (2013.01); *G06Q 30/0272* (2013.01)

(56) References Cited

U.S. PATENT DOCUMENTS

| | | | | |
|---|---|---|---|---|
| 2019/0164140 | A1* | 5/2019 | Pasupula | G06Q 30/08 |
| 2019/0279240 | A1* | 9/2019 | DiTomaso | H04L 9/3239 |
| 2019/0279241 | A1* | 9/2019 | DiTomaso | H04L 9/3239 |
| 2019/0279257 | A1* | 9/2019 | Kokernak | G06Q 30/0273 |
| 2019/0332807 | A1* | 10/2019 | LaFever | G06F 21/6254 |
| 2020/0005284 | A1* | 1/2020 | Vijayan | G06Q 20/02 |
| 2020/0012765 | A1* | 1/2020 | Smaiely | H04L 9/0637 |
| 2020/0081999 | A1* | 3/2020 | Mueller | H04L 9/3239 |
| 2020/0084483 | A1* | 3/2020 | Brown | G06Q 20/401 |
| 2020/0090143 | A1* | 3/2020 | Iervolino | H04L 63/0807 |
| 2020/0143014 | A1* | 5/2020 | LeBeau | G06Q 20/127 |
| 2020/0272981 | A1* | 8/2020 | Kirkegaard | G06F 16/2379 |
| 2020/0394161 | A1* | 12/2020 | Mahajan | H04L 9/3247 |
| 2021/0110417 | A1* | 4/2021 | Lade | G06Q 20/0457 |
| 2021/0133721 | A1* | 5/2021 | Ponceleon | G06Q 30/0214 |
| 2021/0150541 | A1* | 5/2021 | Gurbuxani | G06Q 30/0276 |
| 2021/0233048 | A1* | 7/2021 | Park | G06Q 10/103 |

FOREIGN PATENT DOCUMENTS

| | | | | |
|---|---|---|---|---|
| CN | 109743368 A | | 5/2019 | |
| CN | 202011455106 A | * | 12/2020 | ............. G06Q 30/02 |
| KR | 2018-0141170 A | * | 11/2018 | ............. G06Q 30/02 |
| KR | 2019-0149505 A | * | 11/2019 | ............. G06Q 30/02 |
| WO | WO 2019/235736 A1 | * | 4/2019 | ............. G06Q 30/02 |
| WO | WO 2020/180754 A1 | * | 3/2020 | ............... H04L 9/08 |

OTHER PUBLICATIONS

User Data Sharing Frameworks: A Blockchain-Based Incentive Solution, Shrestha et al., 978-1-7281-2530-5/19/$31.00 © 2019 IEEE.*

Reliable, Fairand Decentralized Marketplace for Content Sharing Using Blockchain, Banerjee et al., arXiv:2009.11033v1 [cs.CR] Sep. 23, 2020.*

* cited by examiner

METHOD, COMPUTING DEVICE AND SYSTEM FOR PROFIT SHARING

BACKGROUND OF THE INVENTION

1. Field of the Invention

The present invention relates to a method, computing device and system for profit sharing, and more particularly, to a method, computing device and system for profit sharing capable of protecting sales records while winning the trust of suppliers.

2. Description of the Prior Art

Distributed ledger technology is widely used in different fields. Since the data recorded on the distributed ledger network is immutable and undeniable, the distributed ledger has won people's trust. However, from a business perspective, the transparency of data on the distributed ledger may not be welcome in certain scenarios.

For example, when a trade is based on profit sharing, sales records (e.g. fees charged from customers) may be trade secrets that should not be known to others. However, shared profit is based on sales records which should be disclosed to the business parties. If the sales record is hidden, it may destroy the trust between the business parties of this trade. In the face of this conflict, it is a great challenge to use technical methods to maintain the advantages of distributed ledger technology, protect sales records and win the trust of suppliers at the same time.

SUMMARY OF THE INVENTION

It is therefore an objective of the present invention to provide a method, computing device and system for profit sharing capable of protecting sales records while winning the trust of suppliers.

The present invention discloses a method for profit sharing. The method includes deciding a first sharing rate according to a first event information and a first category information; obtaining a first sharing amount according to the first sharing rate and a first shared profit of the first category information; deciding a second sharing rate according to a second event information and a second category information; obtaining a second sharing amount according to the second sharing rate and a second shared profit of the second category information; deciding a total sharing amount by summing up the first sharing amount and the second sharing amount; and returning the total sharing amount in response to receiving a request from a user device.

The present invention further discloses a system for profit sharing. The system is connected to a user device, and includes a distributed ledger network, storing at least one ledger recorded with a plurality of event records; and a computing device, connected to the distributed ledger network. The computing device performs: obtaining the first event information, the first category information, the second event information and the second category information according to the plurality of event records; deciding a first sharing rate according to the first event information and the first category information; obtaining a first sharing amount according to the first sharing rate and a first shared profit of the first category information; deciding a second sharing rate according to the second event information and the second category information; obtaining a second sharing amount according to the second sharing rate and a second shared profit of the second category information; deciding a total sharing amount by summing up the first sharing amount and the second sharing amount; and returning the total sharing amount in response to receiving a request from a user device.

The present invention further discloses a computing device for profit sharing. The computing device includes a communication device, connected to a distributed ledger network storing a plurality of event records; and a processor, connected to the communication device. The processor performs: obtaining a first event information, a first category information, a second event information and a second category information according to the plurality of event records of the distributed ledger network; deciding a first sharing rate according to the first event information and the first category information; obtaining a first sharing amount according to the first sharing rate and a first shared profit of the first category information; deciding a second sharing rate according to the second event information and the second category information; obtaining a second sharing amount according to the second sharing rate and a second shared profit of the second category information; deciding a total sharing amount by summing up the first sharing amount and the second sharing amount; and returning the total sharing amount in response to receiving a request from a user device.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
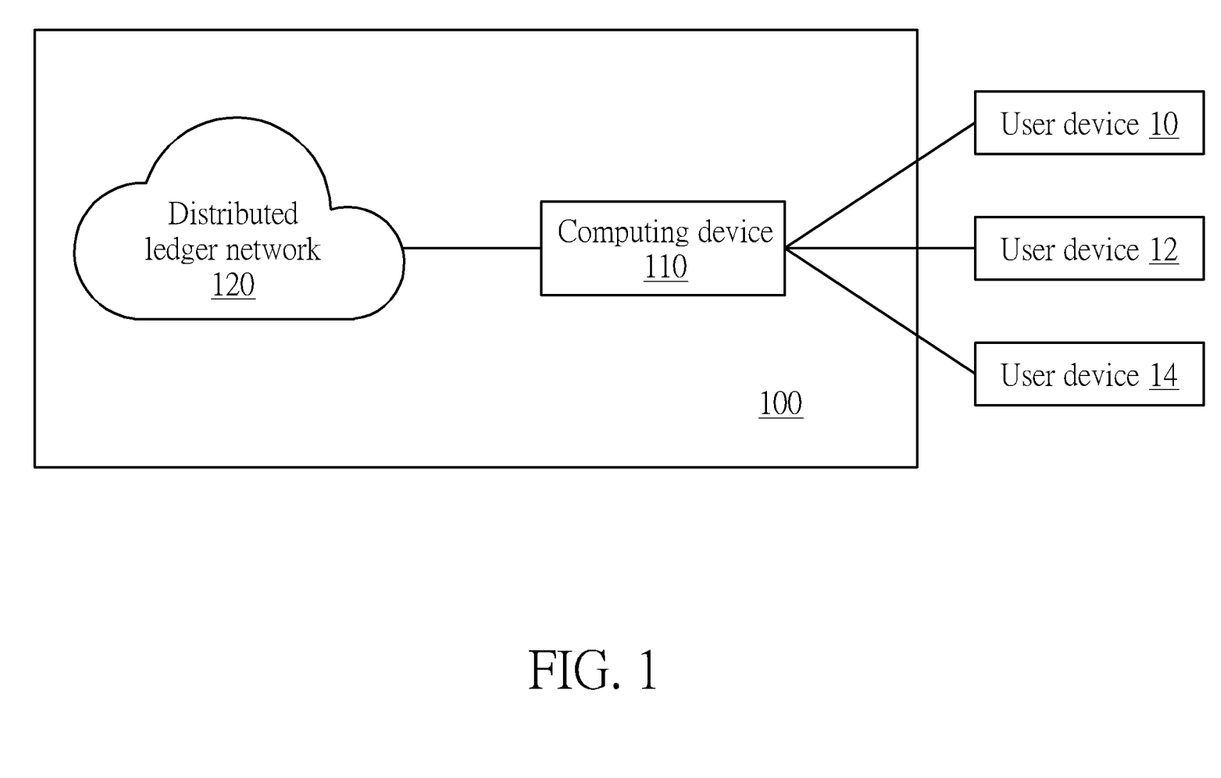
FIG. 1 illustrates a schematic diagram of a system for profit sharing in an embodiment of the invention.

Referring to FIG. 1, FIG. 1 illustrates a schematic diagram of a system 100 for profit sharing in an embodiment of the invention. The system 100 for profit sharing includes a computing device 110 and a distributed ledger network 120, and the computing device 110 is connected to the distributed ledger network 120 in a communication manner. In this embodiment, the computing device 110 may be a server which runs a software to access the distributed ledger network 120 and obtain the profit sharing information. The distributed ledger network 120 may be formed by multiple nodes, and each node has an identical and immutable ledger. In this embodiment, the distributed ledger network 120 is a blockchain network. The user devices 10-14 may connect to the profit sharing system 100 by connecting to the computing device 110 in a communication manner, and thus obtain the profit sharing information.

Figure 2:
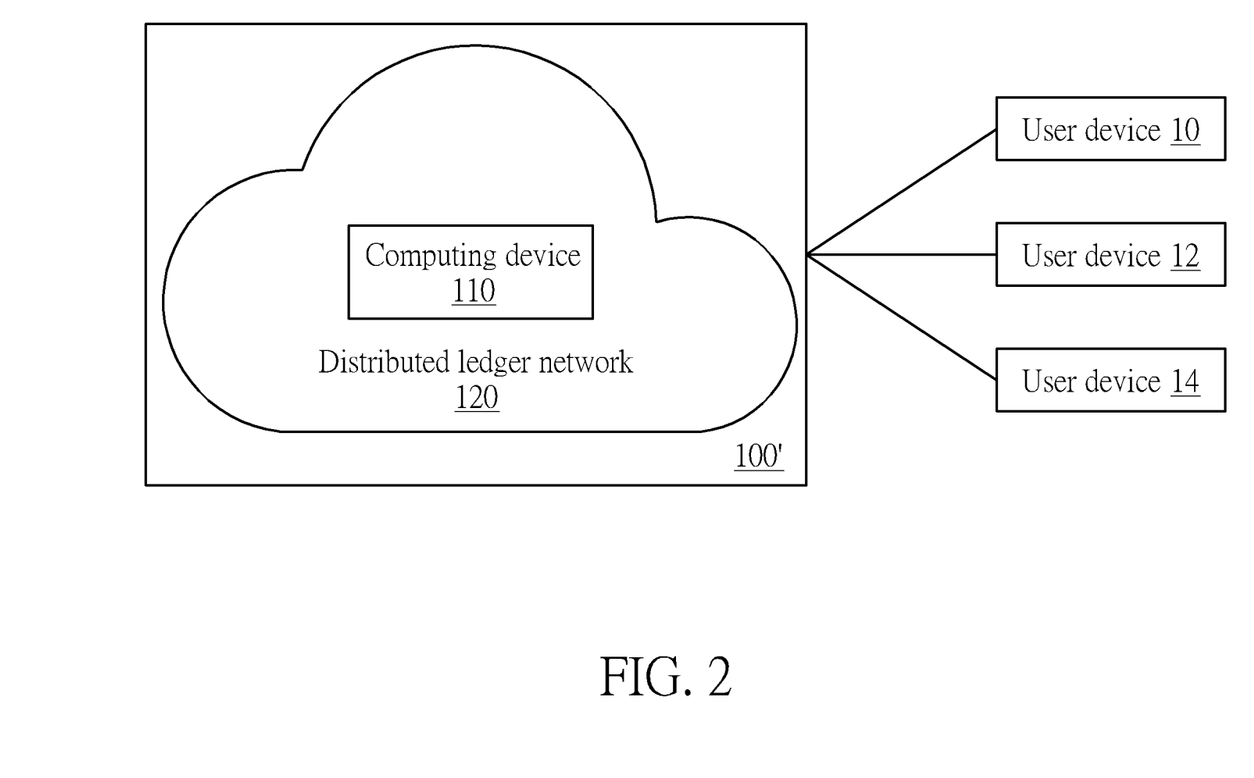
FIG. 2 illustrates a schematic diagram of a system for profit sharing in another embodiment of the invention.

Referring to FIG. 2, FIG. 2 illustrates a schematic diagram of a system 100' for profit sharing in another embodiment of the invention. Similar to the FIG. 1, the system 100' also includes a computing device 110 and a distributed ledger network 120, however, the computing device 110 is a node on the distributed ledger network 120. That is, the computing device 110 also stores an immutable ledger.

It should be noted that, both FIG. 1 and FIG. 2 are for illustration purposes only, the invention is not limited to thereto. For example, an external server and an external database can be optionally connected to the system 100 or 100'. The number of the user devices can be less, equal or more than 3.

Figure 3:
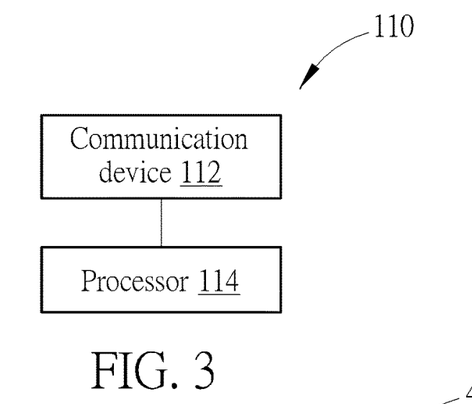
FIG. 3 illustrates a schematic diagram of a computing device for profit sharing in an embodiment of the invention.

Refer to FIG. 3, FIG. 3 illustrates a schematic diagram of a computing device 110 for profit sharing in an embodiment of the invention. The computing device 110 in FIG. 1 and FIG. 2 can be implemented as the hardware shown on FIG. 3.

The computing device 110 includes a communication device 112 and a processor 114. The communication device 112 is, for example, a chip compatible with at least one of Wi-Fi, LAN, Ethernet, Bluetooth, and LTE. The computing device 110 is connected to the distributed ledger network 120 via the communication device 112.

The processor 114 performs all computing needed to implement the function provided by the computing device 110. The processor is, for example, a CPU, a DSP, an ASIP or other devices having computing capabilities.

In some embodiments, the computing device 110 may optionally be configured with a storage device, such as a Hard Disk Drive (HDD) and a Solid-state drive (SSD). In another embodiments, the computing device 110 may store data on an external device (for example, a cloud storage or a blockchain network), but the invention is not limited thereto.

The nodes of the distributed ledger network 120 may be any device with communication capabilities, storage space and computing capabilities, for example, personal computers, notebooks, tablets and mobile devices, but the invention is not limited thereto.

The user devices 10-14 may be any electronic device having communication function, for example, personal computers, notebooks, tablets and mobile devices, the invention is not limited thereto.

Figure 4:
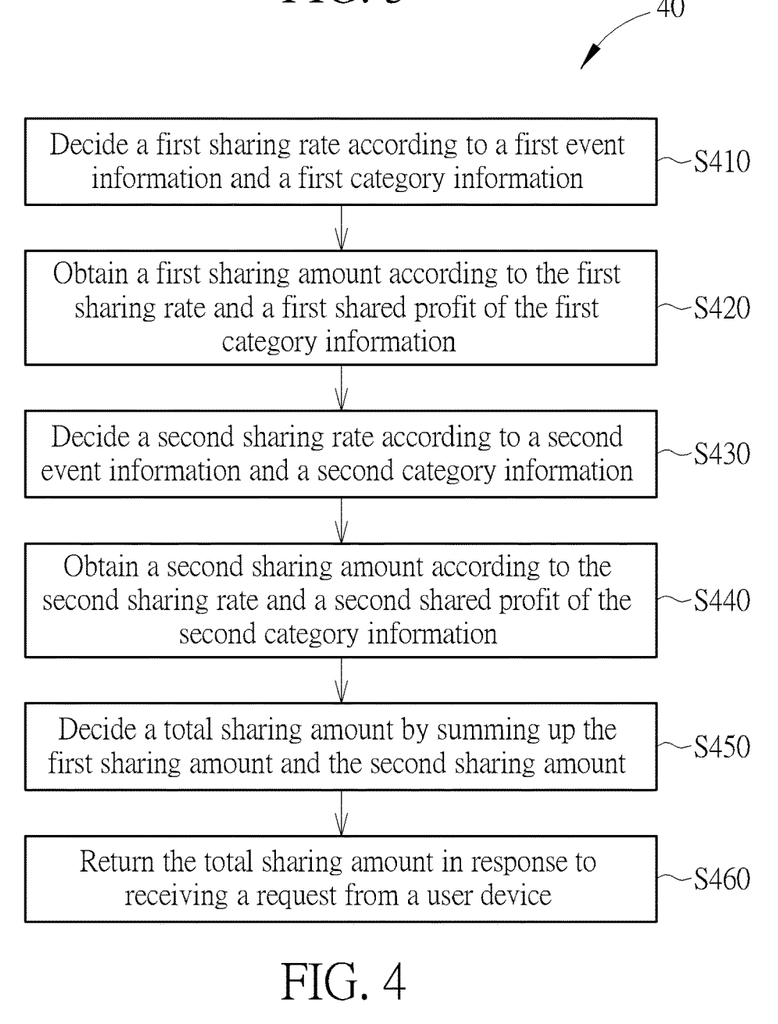
FIG. 4 illustrates a flowchart of a method for profit sharing in an embodiment of the invention.

FIG. 4 illustrates a flowchart of a method 40 for profit sharing in an embodiment of the invention. The method 40 may be implemented on the computing device 110 of the system 100 or 100' illustrated on FIG. 1 or FIG. 2, but it is not limited thereto.

In this embodiment, the system provider of the system 100 or 100' provides technical services, and the user devices 10-14 may be owned by suppliers. For example, the system provider establishes the system 100 or 100' as a news platform system which provides online news with commercial advertisement to readers, and charges fees from advertisers. The user devices 10-14 are owned by news providers who may share the profits with the system provider. In the following description, this example will be used to illustrate the invention, but it is not limited thereto. In this example, an advertisement is displayed on a news page, for example, the advertisement is embedded in a widget or pops up on the news page. In other words, when a user read a news page, the user also sees the advertisement at the same time.

The method 40 of this embodiment includes the following steps:

Step S410: Decide a first sharing rate according to a first event information and a first category information.

Step S420: Obtain a first sharing amount according to the first sharing rate and a first shared profit of the first category information.

Step S430: Decide a second sharing rate according to a second event information and a second category information.

Step S440: Obtain a second sharing amount according to the second sharing rate and a second shared profit of the second category information.

Step S450: Decide a total sharing amount by summing up the first sharing amount and the second sharing amount.

Step S460: Return the total sharing amount in response to receiving a request from a user device.

The categories may be "life", "real estate", "weather" and "business", but it is not limited thereto. In an example, we divide the news pages into different categories according to their contents. For example, if a content of a news is about restaurant opening, it is classified as "life". If a content of a news page is related to house sales, it is classified as "real estate". If a content of a news page is related to weather prediction, it is classified as "weather". If a content of a news page is related to chief executive officer (CEO) talk, it is classified as "business". For simplicity, only two categories are adopted in the following description, but here is not limited thereto.

An event is detected when a reader clicks the advertisement displayed on the news page. In another embodiment, an event is detected and recorded as an event record when a reader clicks a hyperlink of the news. In both embodiments, the category to which the event belongs is determined according to the content of the news page. For example, an event is belonged to "life" category if the clicked advertisement displayed on the "life" news or the news connected to the hyperlink. Furthermore, at least one of a click log, a watch time of the news and a traffic value of the event is recorded as an event record when the event is detected.

It should be noted that, in this embodiment, the event records would be stored on the distributed ledger network 120 (i.e. on chain). That is, any device linked to the distributed ledger network 120 may know the events occurred.

Each category corresponds to a category information, and the category information is obtained from the corresponding event records of the category. For example, the categories of "life" and "real estate" are respectively corresponding to a first category information and a second category information, and the first category information and the second category information respectively comprise at least one of a total click count, a total watch time and a total traffic value of the events according to the event records. For example, if the event records corresponding to category "life" are 100 click logs, the first category information may be "click count, 100". If the event records corresponding to category "life" are 60 minutes for total, the first category information may be "time, 60 min". If the event records corresponding to category "life" are 1 Gigabits for total, the first category information may be "traffic value, 1 GB". The second category information may be set in similar way, here is not going further for simplicity.

In addition, a total profit or fees of the corresponding category is also comprised in each category information, which is called the total profit thereafter.

Event information is obtained from the event records of a specific category and a specific entity (i.e. a specific news provider). For example, a first event information is obtained from the event records corresponding to category "life" and A media company, a second event information is obtained from the event records which correspond to A media company and the category "real estate", a third event information is obtained from the event records which correspond to B media company and the category "life", and a fourth event information is obtained from the event records which correspond to B media company and the category "real estate". The first event information, the second event information, the third event information and the fourth event information can be set in similar way of the category information, here is not described for the sake of simplicity.

In an embodiment, to avoid fraud, the category information and the event information may be determined according to the normal event records solely. In other words, abnormal event records (i.e. the corresponding events are determined as an abnormal activity) may be excluded. The abnormal activity is, for example, that an advertisement shown on a specific news is clicked from a specific IP for 100 times in one minute. In that case, only the first click log is determined as normal event record. The determination criteria of the abnormal activity may be various from the system providers and may not be released, thereby preventing abnormal activities from getting around the determination criteria, but here is not limited thereto.

It should be noted that, the category information and the event information may or may not be recorded on the distributed ledger network 120 (e.g. storing at least one ledger recorded with a first event information, a first category information, a second event information and a second category information), here is not limited thereto.

In another embodiment, the system 100 may trace a track of a reader and determine the contribution ratio of the read news, so as to obtain the first event information accordingly. For example, a reader firstly clicks a first news from the homepage, then views a second news by clicking a hyperlink embedded on the first news. A third news is viewed thereafter by clicking a hyperlink embedded on the second news, and then the event is occurred while the reader viewing the third news. In that case, the system 100 may determine the contribution ratio of the first news, the second news and the third news are 10%, 30% and the 60%. In other words, if this event record is a click log, the first news is given 0.1 click count, the second news is given (e.g. given extra click count or share the click count) 0.3 click count and the third news is given 0.6 click count, and the corresponding category information and the corresponding event information are updated accordingly. In an example, the dependency may be reset when the reader returns back to the homepage. In another example, the system 100 only divides the click count to limited dependent levels (i.e. the nearest three levels), here is not limited thereto. Also, the level of the dependency and the contributions may be decided according to the system provider's policy, here is not limited thereto.

In step S410, the computing device 110 decides a first sharing rate according to a first event information (e.g. the event information corresponding to the category "life" and provided by A media company) and a first category information (e.g. the event information corresponding to the category "life"). Specifically, if the first event information is obtained from a first click count, the computing device 110 calculates a ratio of a first click count to a total click count of the first category information as the first sharing rate. If the first event information is obtained from a first watching time, the computing device 110 calculates a ratio of a first watching time to a total watch time of the first category information as the first sharing rate. If the first event information is obtained from a first traffic value, the computing device 110 calculates a ratio of a first traffic value to a total traffic value of the first category information as the first sharing rate.

In step S420, the computing device 110 obtains a first sharing amount according to the first sharing rate and a first shared profit of the first category information. In detail, the system provider may have a fee agreement (for example, by smart contract) with an advertiser. Accordingly, a profit can be obtained according to the corresponding fee agreement, and the total profit of the first category can be obtained according to the profits of all events belonged to the first category.

The first shared profit is determined according to the system provider's policy. The first shared profit may be a certain percentage of the total profit of the first category. In this embodiment, the certain percentage is given as 50% (i.e. the first shared profit=50% of the total profit of the first category), but it is not limited thereto. The computing device 110 obtains the first shared profit from the first category information and calculates the first sharing amount by multiplying the first sharing rate and the first shared profit.

In step S430, the computing device 110 decides a second sharing rate according to a second event information (e.g. the event information corresponding to the category "real estate" and provided by A media company) and a second category information (e.g. the event information corresponding to the category "real estate"). In step S440, the computing device 110 obtains a second sharing amount according to the second sharing rate and a second shared profit of the second category information. The steps S430-S440 are similar to the step S410 and S420, and here does not go further details.

The certain percentages which are corresponding to the first/second shared profit may be different, for example, the certain percentage corresponding to the first shared profit may be 50%, and certain percentage corresponding to the second shared profit may be 30%. In some embodiment, the certain percentage may be a floating value and affected by the corresponding profit. In detail, the cost ratio of the system 100 is relatively lower when the profit is growing higher, accordingly, the certain percentage may be higher when the profit is higher than a threshold. The certain percentage can may be set in any various way, here is not limited thereto.

In step S450, the computing device 110 decides a total sharing amount by summing up the first sharing amount and the second sharing amount.

In detail, the sharing amount, which is referred in step S420 and S440, can be represented by the following equation (1):

$$x_n \times f_n(k) = y_{kn} \quad (1)$$

$x_n$ is a shared profit corresponding to a category n. $f_n(k)$ is the sharing rate of the news provider k corresponding to the category n. y is the sharing amount corresponding to the category which is belonged to news provider k.

It should be noted that, the equation of sharing amount may be different according to the sharing policy. For example, the sharing amount may also be obtained according to the following equation (2):

$$x_n \times f_n(k) \times m = y_{kn} \quad (2)$$

$x_n$, $f_n(k)$ and y are the same as the parameters of equation (1), however, the m is a dynamic parameter which is decided according to the sharing policy as follows (e.g. a higher sharing rate may be corresponding to a higher or lower dynamic parameter and thus a higher or lower much sharing amount is obtained according to practical requirements):

$$m = \begin{cases} i_1, & \text{if } T_1 > f_n(k), \\ i_2, & \text{if } T_2 > f_n(k) > T_1, \\ i_3, & \text{if } f_n(k) > T_2 \end{cases}$$

In another example, the sharing amount can be obtained according to the following equation (3):

$$\Sigma(x_n \times f_n(k) \times m(i)) = y_{kn} \quad (3)$$

The equation (3) is similar with the equation (2). However, the equation (3) is progressive percentage by multiplying a dynamic m(i), while the equation (2) is flat percentage. The equations of sharing amount are not limited to equations (1)-(3), and any appropriate variation may be accepted in this invention.

Accordingly, taking the equation (1) for example, the step S450 can be represented by the following equations (4)-(6):

$$x_1 \times f_1(k) = y_{k1} \quad (4)$$

$$x_2 \times f_2(k) = y_{k2} \quad (5)$$

$$y_{k1} + y_{k2} = Y_k \quad (6)$$

As described before, the first sharing amount and the second sharing amount correspond to the same entity (the news provider k), accordingly, the summarized total sharing amount also corresponds to the same entity.

Furthermore, the steps S410-S450 may be performed when a condition is satisfied. In an example, the condition is a certain time duration, for example, one week, one month, three months, half a year or one year, but it is not limited thereto. In another example, the condition may be a preset threshold of the event information or the category information. For example, when one of the category information reaches a threshold (i.e. 10,000 clicks), or the event information of an entity reaches a threshold (i.e. 1,000 clicks or 20% clicks of the corresponding category), the steps S410-S450 are performed automatically. In another example, when one of the profits (corresponding to clicks) of the categories reaches a certain amount, the steps S410-S450 are performed accordingly. In another example, when a new news provider joins this profit sharing project and registers to the system 100, the steps S410-S450 are performed for settlements of current shared amounts. In another example, the steps S410-S450 are performed by manual activation. The invention is not limited thereto.

In addition, in one case, the steps S410-S450 may be performed every time when a request is received. In another example, the steps S410-S450 are performed only onetime, after the steps S410-S450 are performed in the first time, the first/second event information, the first/second category information, the first/second sharing rate, the first/second sharing amount, and the total sharing amount are recorded as a historical information, and the first/second event information and the first/second category information are correspondingly reset. And the computing device 110 returns the total sharing amount by reading the stored historical total sharing amount.

In step S460, the computing device 110 returns the total sharing amount in response to receiving a request from one of the user devices 10-14.

Here is a case for further illustration. If there are only three different news providers and only two different categories of news, a case may be as following table:

TABLE

| | Total profit | Shared profits | News provider P1 | News provider P2 | News provider P3 |
|---|---|---|---|---|---|
| Category C1 | $2x_1$ | $x_1$ | 20% | 30% | 50% |
| Category C2 | $2x_2$ | $x_2$ | 40% | 20% | 40% |
| Total shared profit | | | $Y_{P_1}$ | $Y_{P_2}$ | $Y_{P_3}$ |

In this example, the total profit of the first category C1 is $2x_1$, the shared profit of the first category C1 is $x_1$ (50% of the total profit of the first category C1). As described above, the sharing rates of each news providers under the category C1 are determined according to the ratio of (event records of) the event information to (event records of) the category information, accordingly, the sum of all the sharing rates of the different news providers P1, P2 and P3 on the category C1 should be 100%, see the table above.

In addition, the sharing amount is obtained according to the equation (1) in this example. Therefore, for the news provider P1, the first sharing rate is 20% and the second sharing rate is 40%, it obtains 20% shared profit on the category C1 and 40% shared profit on the category C2, thus, the total shared profit $Y_{P_1}$ can be represented as:

$$Y_{P_1} = x_1 \times 20\% + x_2 \times 40\%$$

Similarly, the total shared profit $Y_{P_2}$, $Y_{P_3}$ of the news providers P2, P3 can be represented as:

$$Y_{P_2} = x_1 \times 30\% + x_2 \times 20\%$$

$$Y_{P_3} = x_1 \times 50\% + x_2 \times 40\%$$

And the total sharing amount can be represented as:

$$Y = Y_{P_1} + Y_{P_2} + Y_{P_3}$$

Under such a situation, the computing device 110 may only return a portion of data in equations (1)-(6) in response to the request from a user device, such that the shared profit $x_n$ and the corresponding total profit of the category n may not be calculated by the user device. In an example, the computing device 110 does not return the first sharing rate (e.g. $f_1(k)$) and the second sharing rate (e.g. $f_2(k)$), nor the first event information, the first category information, the second event information, and the second category information. However, the equation of the sharing amount (i.e. equation (1)) can be obtained from the distributed ledger network 120. Since there are many different combinations of the first sharing profit (e.g. $x_1$), the second sharing profit (e.g. $x_2$), the first sharing rate (e.g. $f_1(k)$) and the second sharing rate (e.g. $f_2(k)$) under the given total shared amount (e.g. Y), it is impossible to know the exactly values of the first/second sharing rate, the first/second event information, the first/second category information and the first/second category profit.

In another example, the computing device 110 returns the total sharing amount (e.g. Y), the first sharing rate (e.g. $f_1(k)$) and the second sharing rate (e.g. $f_2(k)$). However, the equation of the sharing amount (e.g. which one of equations (1)-(3) and the dynamic parameter m or $m_k$) is unknown to the users. Accordingly, the news provider may at most know the total sharing amount, the first sharing rate and the second sharing rate. It is hard to know the exact first shared amount of the first category profit and the second shared amount of the second category profit by inference.

In another example, the computing device 110 returns the total sharing amount (e.g. Y), the first sharing rate (e.g. $f_1(k)$) and the second sharing rate (e.g. $f_2(k)$), also, the equation (1)

can obtained from the distributed ledger network 120. Even the user know the first/second sharing rate and the equation (1), however, the combinations of the first/second sharing rate (e.g. $f_1(k)/f_2(k)$) with the first/second category profits (e.g. $x_1/x_2$) are approaching infinity under the specific total sharing amount (e.g. Y). Accordingly, it is hard to obtain the first/second category profits.

In another example, the computing device 110 returns the first sharing amount (e.g. $y_1$) and the second sharing amount (e.g. $y_2$) without the equation (1) and the first/second sharing rate (e.g. $f_1(k)/f_2(k)$). Alternatively, the computing device 110 returns the first/second sharing amount and the equation of the sharing amount, however, the first/second sharing rates are unknown to the user. Therefore, it is hard to know the exact value of the actual profit of the first category and the actual profit of the second category.

In short, the computing device 110 may only return the sharing amounts, the sharing rates or neither to avoid the profits of first/second category leakage. Any variation may be adopted if the shared profits of the first/second categories are unknown to the user.

It should be noted that, in the above description, only the first/second event information, the first/second sharing rates, the first/second sharing amount and the first/second category information are mentioned (i.e. 2), however, the numbers of the event information, the sharing rates, the sharing amounts, and the category information are not limited thereto.

In another example of this embodiment, we divide the advertisement, instead of news, into different categories. Therefore, which category the event belongs to is determined according to the content of the advertisement.

The first event information and the second event information respectively correspond to different categories but a same entity (i.e. news provider). To be specific, the first event information is obtained from the event records corresponding to a "life" advertisement which displayed on the news provided by A media company is clicked. The second event information is obtained from the event records corresponding to a "real estate" advertisement displayed on the news provided by A media company is clicked. Also, another event information may be obtained from the event records corresponding to a "life" advertisement displayed on the news provided by B media company is clicked.

The method for profit sharing may be implemented according to the setting of the category and event information of this example, and the details can be referred to the description above, here does not repeat for the sake of simplicity.

However, since the news provider does not know the actual profit amount of each category, the present invention further provides a proof manner for news providers to trust this profit sharing way. The proof manner receives proof profits from a news provider (e.g. the news provider may set the proof profits as any value) to substitute with shared profit $x_n$ in equations (1)-(6), so as to return a total proof sharing amount for proof.

Accordingly, in an embodiment, the computing device 110 receives a first proof profit and a second proof profit from the user devices 10-14. The computing device 110 obtains a first proof amount according to the first sharing rate and the first proof profit, and obtains a second proof amount according to the second sharing rate and the second proof profit. Accordingly, the computing device 110 decides a total proof sharing amount by summing up the first proof amount and the second proof amount, and returns the total proof sharing amount to the user devices 10-14.

That is, the news providers may input any proof profit amount to check whether the output is correct. If the output is always correct with the proof profits inputted by the news providers and other information provided to the news providers, then the news providers may assume that the system 100 and the computing device 110 are trustworthy (zero-knowledge proof).

In this embodiment, the inputs from the news providers are for proof only. Thus, the inputs of the proof profits and corresponding outputs of the total proof sharing amount are not stored on the distributed ledger network 120.

It should be noted that, this invention may be used in different scenarios, for example, the system provider may provide a travel blog platform which allows publishers publish travel notes and automatically attach corresponding travel tours of different travel agencies on the posts.

The system provider charges the travel agencies when the travel tours are clicked or booked and shares profits to publishers. Or, the system provider may automatically attach corresponding local hotels, and the system provider charges hotels when the hotels are clicked or booked and shares the profits to publishers. By the above embodiments of this invention, the publisher may not know which travel agency the profits come from.

To sum up, the embodiments of the present invention may maintain the advantages of distributed ledger technology, while protecting sales records (e.g. shared profits) and winning the trust of suppliers at the same time.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for profit sharing on a blockchain via a computing device, wherein the blockchain has multiple nodes and each node has an identical and immutable ledger recorded with a plurality of event records, the profit is obtained from commercial advertisement, and the computing device accesses to the blockchain and performs the method comprising steps of:

deciding a first sharing rate according to a first event information and a first category information based on online information platforms;

obtaining a first sharing amount according to the first sharing rate and a first shared profit of the first category information;

deciding a second sharing rate according to a second event information and a second category information based on the online information platforms;

obtaining a second sharing amount according to the second sharing rate and a second shared profit of the second category information;

deciding a total sharing amount by summing up the first sharing amount and the second sharing amount;

returning the total sharing amount in response to receiving a request from a user device without returning at least one of:

a value set of the first event information, the first category information, the second event information and the second category information;

a value set of the first sharing rate and the second sharing rate; and a value set of the first sharing amount and the second sharing amount; and performing a profit verification method in response to receiving a first proof profit and a second proof profit from the user device, wherein the profit verification method comprises:
  obtaining a first proof amount according to the first sharing rate and the first proof profit;
  obtaining a second proof amount according to the second sharing rate and the second proof profit;
  deciding a total proof sharing amount by summing up the first proof amount and the second proof amount; and
  returning the total proof sharing amount to the user device for checking a trustworthiness of returned total proof sharing amount;
wherein a track of a reader is traced according to the plurality of event records, and the first category information, the second category information, the first event information or the second event information is obtained or updated according to the track of the reader.

2. The method of claim 1 further comprises:
  detecting an event in response to a click of an advertisement displayed on the news page or a click of a hyperlink of a news;
  recording an event record in response to the detection of the event, wherein the event record is recorded on a blockchain and corresponding to at least one of a click log, a watch time and a traffic value; and
  determining the first category information, second category information, first event information and second event information according to a normal event record of the event record.

3. The method of claim 1, wherein the step of deciding the first sharing rate according to the first event information and the first category information comprises at least one of:
  calculating a ratio of a first click count of the first event information to a first category click count of the first category information as the first sharing rate;
  calculating a ratio of a first watching time of the first event information to a first category watching time of the first category information as the first sharing rate; and
  calculating a ratio of a first traffic value of the first event information to a first category traffic value of the first category information as the first sharing rate.

4. A system for profit sharing, connected to a user device, wherein the profit obtained from commercial advertisement, the system comprises:
  a distributed ledger network, having multiple nodes and storing at least one ledger recorded with a plurality of event records in each node; and
  a computing device, accessing to the distributed ledger network, wherein the computing device performs:
    obtaining the first event information, the first category information, the second event information and the second category information according to the plurality of event records;
    deciding a first sharing rate according to the first event information and the first category information based on online information platforms;
    obtaining a first sharing amount according to the first sharing rate and a first shared profit of the first category information;
    deciding a second sharing rate according to the second event information and the second category information based on the online information platforms;
    obtaining a second sharing amount according to the second sharing rate and a second shared profit of the second category information;
    deciding a total sharing amount by summing up the first sharing amount and the second sharing amount;
    returning the total sharing amount in response to receiving a request from a user device without returning at least one of
      a value set of the first event information, the first category information, the second event information and the second category information;
      a value set of the first sharing rate and the second sharing rate; and
      a value set of the first sharing amount and the second sharing amount; and
    performing a profit verification method in response to receiving a first proof profit and a second proof profit from the user device, wherein the profit verification method comprises:
      obtaining a first proof amount according to the first sharing rate and the first proof profit;
      obtaining a second proof amount according to the second sharing rate and the second proof profit;
      deciding a total proof sharing amount by summing up the first proof amount and the second proof amount; and
      returning the total proof sharing amount to the user device for checking a trustworthiness of returned total proof sharing amount;
    wherein a track of a reader is traced according to the plurality of event records, and the first category information, the second category information, the first event information or the second event information is obtained or updated according to the track of the reader.

5. The system of claim 4, wherein the computing device is one of multiple nodes of the distributed ledger network.

6. The system of claim 4, wherein the computing device further performs:
  detecting an event in response to a click of an advertisement displayed on the news page or a click of a hyperlink of a news;
  recording an event record in response to the detection of the event, wherein the event record is recorded on a blockchain and corresponding to at least one of a click log, a watch time and a traffic value; and
  determining the first category information, second category information, first event information and second event information according to a normal event record of the event record.

7. The system of claim 4, wherein the step of deciding the first sharing rate according to the first event information and the first category information comprises at least one of:
  calculating a ratio of a first click count of the first event information to a first category click count of the first category information as the first sharing rate;
  calculating a ratio of a first watching time of the first event information to a first category watching time of the first category information as the first sharing rate; and
  calculating a ratio of a first traffic value of the first event information to a first category traffic value of the first category information as the first sharing rate.

8. A computing device for profit sharing, wherein the profit is obtained from commercial advertisement, the computing device comprises:
  a communication device, connected to a distributed ledger network having multiple nodes, wherein the distributed ledger network stores at least one ledger recorded with a plurality of event records in each node; and
  a processor, connected to the communication device, wherein the processor performs:

obtaining a first event information, a first category information, a second event information and a second category information according to the plurality of event records of the distributed ledger network;

deciding a first sharing rate according to the first event information and the first category information based on online information platforms;

obtaining a first sharing amount according to the first sharing rate and a first shared profit of the first category information;

deciding a second sharing rate according to the second event information and the second category information based on the online information platforms;

obtaining a second sharing amount according to the second sharing rate and a second shared profit of the second category information;

deciding a total sharing amount by summing up the first sharing amount and the second sharing amount;

returning the total sharing amount in response to receiving a request from a user device without returning at least one of
- a value set of the first event information, the first category information, the second event information and the second category information;
- a value set of the first sharing rate and the second sharing rate; and
- a value set of the first sharing amount and the second sharing amount;

performing a profit verification method in response to receiving a first proof profit and a second proof profit from the user device, wherein the profit verification method comprises:
- obtaining a first proof amount according to the first sharing rate and the first proof profit;
- obtaining a second proof amount according to the second sharing rate and the second proof profit;
- deciding a total proof sharing amount by summing up the first proof amount and the second proof amount; and
- returning the total proof sharing amount to the user device for checking a trustworthiness of returned total proof sharing amount;

wherein a track of a reader is traced according to the plurality of event records, and the first category information, the second category information, the first event information or the second event information is obtained or updated according to the track of the reader.

9. The computing device of claim 8, wherein the processor further performs:

detecting an event in response to a click of an advertisement displayed on the news page or a click of a hyperlink of a news;

recording an event record in response to the detection of the event, wherein the event record is recorded on a blockchain and corresponding to at least one of a click log, a watch time and a traffic value; and determining the first category information, second category information, first event information and second event information according to a normal event record of the event record.

10. The computing device of claim 8, wherein the step of deciding the first sharing rate according to the first event information and the first category information comprises at least one of:

calculating a ratio of a first click count of the first event information to a first category click count of the first category information as the first sharing rate;

calculating a ratio of a first watching time of the first event information to a first category watching time of the first category information as the first sharing rate; and calculating a ratio of a first traffic value of the first event information to a first category traffic value of the first category information as the first sharing rate.

* * * * *